US012804423B2

(12) United States Patent
Moosavi et al.

(10) Patent No.: US 12,804,423 B2
(45) Date of Patent: Nov. 17, 2026

(54) SERVER AND AGENT FOR REPORTING OF COMPUTATIONAL RESULTS DURING AN ITERATIVE LEARNING PROCESS

(71) Applicant: Telefonaktiebolaget LM Ericsson (publ), Stockholm (SE)

(72) Inventors: Reza Moosavi, Linköping (SE); Henrik Rydén, Stockholm (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 18/712,564

(22) PCT Filed: Nov. 26, 2021

(86) PCT No.: PCT/EP2021/083160
§ 371 (c)(1),
(2) Date: May 22, 2024

(87) PCT Pub. No.: WO2023/093994
PCT Pub. Date: Jun. 1, 2023

(65) Prior Publication Data
US 2025/0031066 A1 Jan. 23, 2025

(51) Int. Cl.
*H04W 24/02* (2009.01)
*G06N 20/00* (2019.01)
(Continued)

(52) U.S. Cl.
CPC ............ *H04W 24/02* (2013.01); *G06N 20/00* (2019.01); *H04L 41/16* (2013.01); *H04W 28/02* (2013.01); *H04W 72/21* (2023.01); *H04B 7/0404* (2013.01)

(58) Field of Classification Search
None
See application file for complete search history.

(56) References Cited

U.S. PATENT DOCUMENTS

2015/0280801 A1* 10/2015 Xin ...................... H04B 7/0481 370/329
2016/0226647 A1* 8/2016 Wang ..................... H04B 7/063
(Continued)

OTHER PUBLICATIONS

Feng, Ming, et al., "Game Theoretic Based Intelligent Multi-User Millimeter-Wave MIMO Systems under Uncertain Environment and Unknown Interference", 2019 International Conference on Computing, Networking and Communications (ICNC): Machine Learning for Communication and Networking, 2019, 687-691.
(Continued)

*Primary Examiner* — San Htun
(74) *Attorney, Agent, or Firm* — Murphy, Bilak & Homiller, PLLC

(57) ABSTRACT

There is provided mechanisms for performing an iterative learning process with agent entities. A method is performed by a server entity. The server entity communicating with the agent entities over a radio propagation channel. The method comprises selecting precoding vectors, one individual precoding vector for each of the agent entities. The precoding vectors are to be used by the agent entities when reporting computational results of a computational task to the server entity. The precoding vectors are selected as a function of uplink channel estimates of the radio propagation channel between antennas of all the agent entities to antennas of the server entity. The method comprises configuring the agent entities with the computational task and the precoding vectors. The method comprises performing the iterative learning process with the agent entities until a termination criterion is met.

20 Claims, 12 Drawing Sheets

(51) Int. Cl.

| | |
|---|---|
| ***H04L 41/16*** | (2022.01) |
| ***H04W 28/02*** | (2009.01) |
| ***H04W 72/21*** | (2023.01) |
| *H04B 7/0404* | (2017.01) |

(56) References Cited

U.S. PATENT DOCUMENTS

| | | | | |
|---|---|---|---|---|
| 2019/0274108 | A1* | 9/2019 | O'Shea | G06N 20/00 |
| 2022/0124634 | A1* | 4/2022 | Bai | H04B 17/373 |
| 2022/0247460 | A1* | 8/2022 | Rekaya | G06N 3/084 |
| 2023/0186079 | A1* | 6/2023 | Lee | G06N 3/092<br>706/25 |

OTHER PUBLICATIONS

Park, Chanho, et al., "Bayesian AirComp with Sign-Alignment Precoding for Wireless Federated Learning", arxiv.org, Cornell University Library, XP091054435, Sep. 14, 2021, 1-9.

Sifaou, Houssem, et al., "Robust Federated Learning via Over-The-Air Computation", arxiv.org, Cornell University Library, XP091091114, Nov. 1, 2021, 1-6.

Yang, Kai, et al., "Federated Learning via Over-the-Air Computation", IEEE Transactions on Wireless Communications, vol. 19, No. 3, Mar. 2020, 2022-2035.

* cited by examiner

SERVER AND AGENT FOR REPORTING OF COMPUTATIONAL RESULTS DURING AN ITERATIVE LEARNING PROCESS

TECHNICAL FIELD

Embodiments presented herein relate to a method, a server entity, a computer program, and a computer program product for performing an iterative learning process with agent entities. Embodiments presented herein further relate to a method, an agent entity, a computer program, and a computer program product for performing the iterative learning process with the server entity.

BACKGROUND

The increasing concerns for data privacy have motivated the consideration of collaborative machine learning systems with decentralized data where pieces of training data are stored and processed locally by edge user devices, such as user equipment. Federated learning (FL) is one non-limiting example of a decentralized learning topology, where multiple (possible very large number of) agents, for example implemented in user equipment, participate in training a shared global learning model by exchanging model updates with a centralized parameter server (PS), for example implemented in a network node.

FL is an iterative process where each global iteration, often referred to as communication round, is divided into three phases: In a first phase the PS broadcasts the current model parameter vector to all participating agents. In a second phase each of the agents performs one or several steps of a stochastic gradient descent (SGD) procedure on its own training data based on the current model parameter vector and obtains a model update. In a third phase the model updates from all agents are sent to the PS, which aggregates the received model updates and updates the parameter vector for the next iteration based on the model updates according to some aggregation rule. The first phase is then entered again but with the updated parameter vector as the current model parameter vector.

A common baseline scheme in FL is named Federated SGD, where in each local iteration, only one step of SGD is performed at each participating agent, and the model updates contain the gradient information. A natural extension is so-called Federated Averaging, where the model updates from the agents contain the updated parameter vector after performing their local iterations.

Analog modulation as used for the transmission of the model updates with over-the-air computation is susceptible to fading, interference, and other types of channel disturbances caused by transmission over a radio propagation channel.

This can be mitigated by using FL with dedicated agent-to-PS channels. Communication over dedicated agent-to-PS channels can be achieved by using digital modulation and coding. However, using dedicated agent-to-PS channels might cause communication latency and require the need for overhead signalling. Using dedicated agent-to-PS channels thus comes at a cost of an increased need for network resources and computational resources at both the PS and the agents. There could thus be scenarios in which using communication over dedicated agent-to-PS channels for the transmission of the model updates is unfeasible and should be avoided.

SUMMARY

An object of embodiments herein is to address the above issues in order to enable efficient communication between the agents (hereinafter denoted agent entities) and the PS (hereinafter denoted server entity) in scenarios impacted by channel disturbances, without resorting using communication over dedicated agent-to-PS channels.

According to a first aspect there is presented method for performing an iterative learning process with agent entities. The method is performed by a server entity. The server entity communicating with the agent entities over a radio propagation channel. The method comprises selecting precoding vectors, one individual precoding vector for each of the agent entities. The precoding vectors are to be used by the agent entities when reporting computational results of a computational task to the server entity. The precoding vectors are selected as a function of uplink channel estimates of the radio propagation channel between antennas of all the agent entities to antennas of the server entity. The method comprises configuring the agent entities with the computational task and the precoding vectors. The method comprises performing the iterative learning process with the agent entities until a termination criterion is met.

According to a second aspect there is presented a server entity for performing an iterative learning process with agent entities. The server entity comprises processing circuitry. The processing circuitry is configured to cause the server entity to select precoding vectors, one individual precoding vector for each of the agent entities. The precoding vectors are to be used by the agent entities when reporting computational results of a computational task to the server entity. The precoding vectors are selected as a function of uplink channel estimates of the radio propagation channel between antennas of all the agent entities to antennas of the server entity. The processing circuitry is configured to cause the server entity to configure the agent entities with the computational task and the precoding vectors. The processing circuitry is configured to cause the server entity to perform the iterative learning process with the agent entities until a termination criterion is met.

According to a third aspect there is presented a server entity for performing an iterative learning process with agent entities. The server entity comprises a select module configured to select precoding vectors, one individual precoding vector for each of the agent entities. The precoding vectors are to be used by the agent entities when reporting computational results of a computational task to the server entity. The precoding vectors are selected as a function of uplink channel estimates of the radio propagation channel between antennas of all the agent entities to antennas of the server entity. The server entity comprises a configure module configured to configure the agent entities with the computational task and the precoding vectors. The server entity comprises a process module configured to perform the iterative learning process with the agent entities until a termination criterion is met.

According to a fourth aspect there is presented a computer program for performing an iterative learning process with agent entities, the computer program comprising computer program code which, when run on processing circuitry of a server entity, causes the server entity to perform a method according to the first aspect.

According to a fifth aspect there is presented a method for performing an iterative learning process with a server entity. The method is performed by an agent entity. The method comprises obtaining a precoding vector to be used by the agent entity when reporting computational results of a computational task to the server entity. The method comprises obtaining configuration in terms of the computational task from the server entity. The method comprises performing the iterative learning process with the server entity until a termination criterion is met. The agent entity as part of performing the iterative learning process applies the precoding vector to the computational results when sending the computational results to the server entity.

According to a sixth aspect there is presented an agent entity for performing an iterative learning process with a server entity. The agent entity comprises processing circuitry. The processing circuitry is configured to cause the agent entity to obtain a precoding vector to be used by the agent entity when reporting computational results of a computational task to the server entity. The processing circuitry is configured to cause the agent entity to obtain configuration in terms of the computational task from the server entity. The processing circuitry is configured to cause the agent entity to perform the iterative learning process with the server entity until a termination criterion is met. The agent entity as part of performing the iterative learning process applies the precoding vector to the computational results when sending the computational results to the server entity.

According to a seventh aspect there is presented an agent entity for performing an iterative learning process with a server entity. The agent entity comprises an obtain module configured to obtain a precoding vector to be used by the agent entity when reporting computational results of a computational task to the server entity. The agent entity comprises an obtain module configured to obtain configuration in terms of the computational task from the server entity. The agent entity comprises a process module configured to perform the iterative learning process with the server entity until a termination criterion is met. The agent entity as part of performing the iterative learning process applies the precoding vector to the computational results when sending the computational results to the server entity.

According to an eighth aspect there is presented a computer program for performing an iterative learning process with a server entity, the computer program comprising computer program code which, when run on processing circuitry of an agent entity, causes the agent entity to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects provide efficient communication between the server entity and the agent entities so that the server entity can obtain updates from all agent entities, even in situations of high channel disturbances.

Advantageously, these aspects provide robust communication between the server entity and the agent entities in the presence of high channel disturbances.

Advantageously, application of these aspects achieves faster convergence of the iterative learning process than in the absence of these aspects Advantageously, these aspects provide improved accuracy and resilience to fading and noise in federated learning with over-the-air computation. This will lead to less signaling overhead when training an iterative learning model, both in terms of time-frequency overhead and number of iterations.

Advantageously, the use of precoding improves the link-budget, thus reducing the susceptibility to noise and out-of-cell interference, which translates directly into improved resilience and accuracy of the gradient updates.

Advantageously, the use of precoding reduces the risk of having an erroneous update rounds.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The wording that a certain data item, piece of information, etc. is obtained by a first device should be construed as that data item or piece of information being retrieved, fetched, received, or otherwise made available to the first device. For example, the data item or piece of information might either be pushed to the first device from a second device or pulled by the first device from a second device. Further, in order for the first device to obtain the data item or piece of information, the first device might be configured to perform a series of operations, possible including interaction with the second device. Such operations, or interactions, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the first device.

The wording that a certain data item, piece of information, etc. is provided by a first device to a second device should be construed as that data item or piece of information being sent or otherwise made available to the second device by the first device. For example, the data item or piece of information might either be pushed to the second device from the first device or pulled by the second device from the first device. Further, in order for the first device to provide the data item or piece of information to the second device, the first device and the second device might be configured to perform a series of operations in order to interact with each other. Such operations, or interaction, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the second device.

Figure 1:
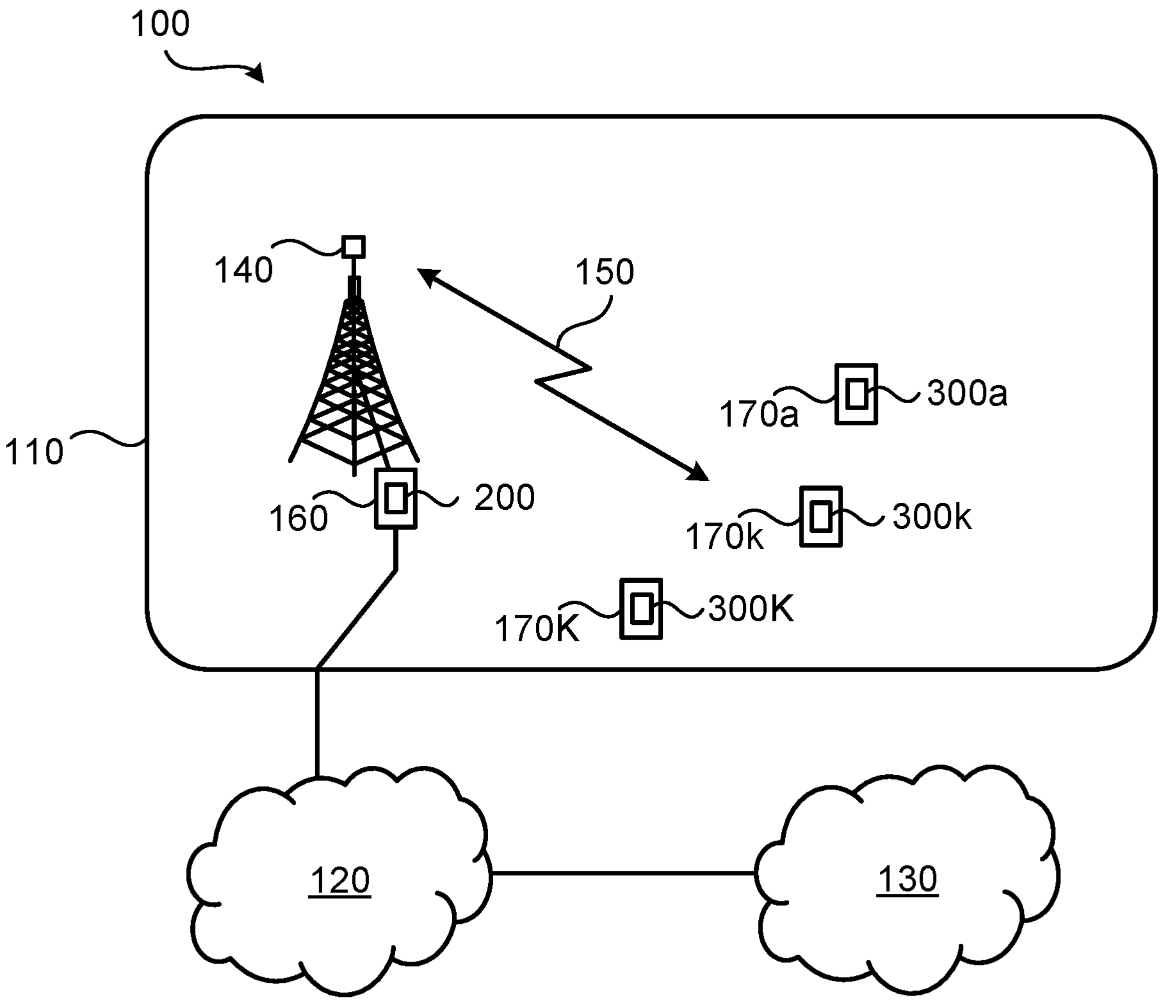
FIGS. 1 and 8 are schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth (5G) telecommunications network, a sixth (6G) telecommunications network, and support any 3GPP telecommunications standard.

The communication network 100 comprises a transmission and reception point 140 configured to provide network access to user equipment 170*a*, 170*k*, 170K in an (radio) access network 110 over a radio propagation channel 150. The access network 110 is operatively connected to a core network 120. The core network 120 is in turn operatively connected to a service network 130, such as the Internet. The user equipment 170*a*:170K is thereby, via the transmission and reception point 140, enabled to access services of, and exchange data with, the service network 130. Each user equipment 170*a*:170K and/or the transmission and reception point 140 is assumed to be equipped with at least two antennas, or antenna elements. In some examples, each of the user equipment 170*a*:170K as well as the transmission and reception point 140 are equipped with a plurality of antennas, or antenna elements.

Operation of the transmission and reception point 140 is controlled by a network node 160. The network node 160 might be part of, collocated with, or integrated with the transmission and reception point 140.

Examples of network nodes 160 are (radio) access network nodes, radio base stations, base transceiver stations, Node Bs (NBs), evolved Node Bs (eNBs), gNBs, access points, access nodes, and integrated access and backhaul nodes. Examples of user equipment 170*a*:170K are wireless devices, mobile stations, mobile phones, handsets, wireless local loop phones, smartphones, laptop computers, tablet computers, network equipped sensors, network equipped vehicles, and so-called Internet of Things devices.

It is assumed that the user equipment 170*a*:170K are to be utilized during an iterative learning process and that the user equipment 170*a*:170K as part of performing the iterative learning process are to report computational results to the network node 160. The network node 160 therefore comprises, is collocated with, or integrated with, a server entity 200. Each of the user equipment 170*a*:170K comprises, is collocated with, or integrated with, a respective agent entity 300*a*:300K.

Figure 2:
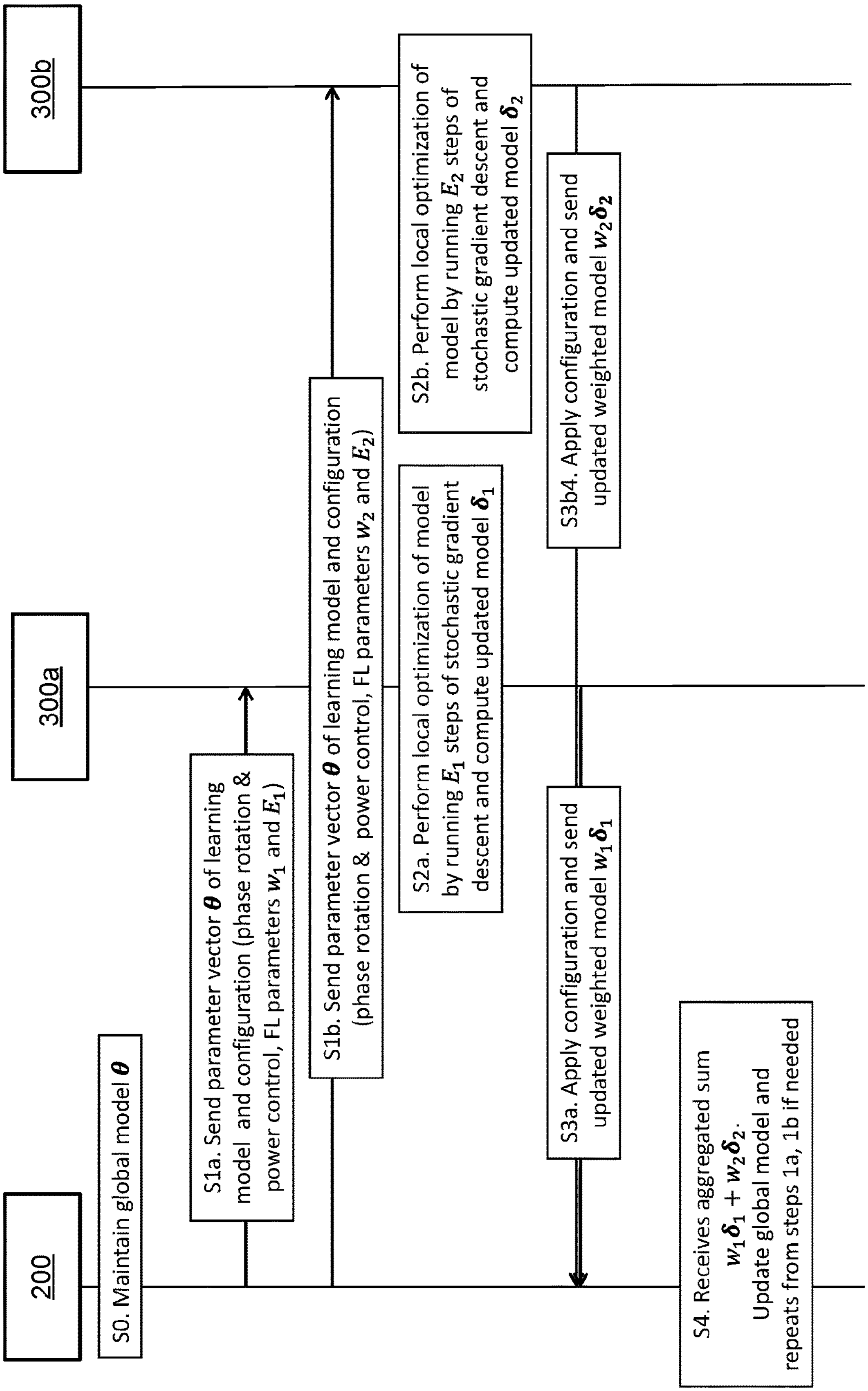
FIG. 2 is a signalling diagram according to an example.

Reference is next made to the signalling diagram of FIG. 2, illustrating an examples of a nominal iterative learning process. Consider a setup with K agent entities 300*a*:300K, and one server entity 200. Each transmission from the agent entities 300*a*:300K is allocated N resource elements (REs). These can be time/frequency samples, or spatial modes. For simplicity, but without loss of generality, the example in FIG. 2 is shown for two agent entities 300*a*, 300*b*, but the principles hold also for larger number of agent entities 300*a*:300K.

The server entity 200 updates its estimate of the learning model (maintained as a global model θ in step S0), as defined by a parameter vector θ(i), by performing global iterations with an iteration time index i. The parameter vector θ(*i*) is assumed to be an N-dimensional vector. At each iteration i, the following steps are performed: Steps S1*a*, S1*b*: The server entity 200 broadcasts the current parameter vector of the learning model, θ(i), to the agent entities 300*a*, 300*b*.

Steps S2*a*, S2*b*: Each agent entity 300*a*, 300*b* performs a local optimization of the model by running T steps of a stochastic gradient descent update on θ(i), based on its local training data;

$$\theta_k(i,\tau)=\theta_k(i,\tau-1)-\eta_k\nabla f_k(\theta_k(i,\tau-1))\tau=1,\ldots,T,$$

where $\eta_k$ is a weight and $f_k$ is the objective function used at agent entity k (and which is based on its locally available training data).

Steps S3*a*, S3*b*: Each agent entity 300*a*, 300*b* transmits to the server entity 200 their model update $\theta_k$ (i);

$$\delta_k(i)=\theta_k(i,T)-\theta_k(i,0),$$

where $\theta_k$(i, 0) is the model that agent entity k received from the server entity 200. Steps S3*a*, S3*b* may be performed sequentially, in any order, or simultaneously.

Step S4: The server entity 200 updates its estimate of the parameter vector θ(i) by adding to it a linear combination (weighted sum) of the updates received from the agent entities 300*a*, 300*b*;

$$\theta(i+1)=\theta(i)+w_1\delta_1(i)+w_2\delta_2(i)$$

where $w_k$ are weights.

Assume now that there are K agent entities and hence K model updates. When the model updates $\{\delta_1, \ldots, \delta_K\}$ (where the time index has been dropped for simplicity) from the agent entities 300*a*:300K over a wireless communication channel, there are specific benefits of using direct analog modulation. For analog modulation, the k:th agent entity could transmit the N components of $\delta_k$ directly over N resource elements (REs). Here an RE could be, for example: (i) one sample in time in a single-carrier system, or (ii) one subcarrier in one orthogonal frequency-division multiplexing (OFDM) symbol in a multicarrier system, or (iii) a particular spatial beam or a combination of a beam and a time/frequency resource.

One benefit of direct analog modulation is that the superposition nature of the wireless communication channel can be exploited to compute the aggregated update, $\delta_1+\delta_2+\ldots+\delta_K$. More specifically, rather than sending $\delta_1, \ldots, \delta_K$ to the server entity 200 on separate channels, the agent entities 300*a*:300K could send the model updates $\{\delta_1, \ldots, \delta_K\}$ simultaneously, using N REs, through linear analog modulation. The server entity 200 could then exploit the wave superposition property of the wireless communication channel, namely that $\{\delta_1, \ldots, \delta_K\}$ add up "in the air". Neglecting noise and interference, the server entity 200 would thus receive the linear sum, $\delta_1+\delta_2+\ldots+\delta_K$, as desired. That is, the server entity 200 ultimately is interested only in the aggregated model update $\delta_1+\delta_2+\ldots+\delta_K$, but not in each individual parameter vector $\{\delta_1, \ldots, \delta_K\}$. This technique can thus be referred to as iterative learning with over-the-air computation.

The over-the-air computation assumes that appropriate power control is applied (such that all transmissions of $\{\delta_k\}$ are received at the server entity 200 with the same power), and that each transmitted $\delta_k$ is appropriately phase-rotated prior to transmission to pre-compensate for the phase rotation incurred by the channel from agent entity k to the server entity 200.

One benefit of the thus described over-the-air computation is the savings of radio resources. With two agents (K=2), 50% resources are saved compared to standard FL since the two agent entities can send their model updates simultaneously in the same RE. With K agent entities, only a fraction 1/K of the nominally required resources are needed.

As disclosed above, analog modulation as used for the transmission of the model updates with over-the-air computation is susceptible to channel disturbances. As further disclosed above, there could be scenarios in which using communication over dedicated agent-to-PS channels for the transmission of the model updates is unfeasible and should be avoided.

Further in this respect, due to fading and interference, the received aggregated vector $\delta_1+\delta_2+\ldots+\delta_K$ may be corrupted. An antenna array with a plurality of antennas, say M antennas, at the server entity 200 can be used to receive $\delta_1+\delta_2+\ldots+\delta_K$. However, when the k:th agent entity 300*k* transmits, the phase rotations incurred by the radio propagation channel 150 from this agent entity 300*b* to each of the M antennas at the server entity 200 will be different. This means that there is no universal rotation $e^{-j\theta_k}$ that applies for the kth agent entity 300*k*. For example, consider a setup with M=2 antennas at the server entity 200. If agent entity 1 selects its phase rotation only considering antenna 1 at the server entity 200, that antenna would receive the signal $\delta_1$ while antenna 2 at the server entity 200 could in the worst case receive $-\delta_1$, which would be detrimental. Techniques for selecting the best rotation for each agent entity 300*a*:300K incurs a compromise.

As an introductory non-limiting and illustrative example, assume that there are K=3 agent entities 300*a*, 300*b*, 300*c*, that there are M=2 antennas at the server entity 200, and that there are L=2 antennas per agent entity. Assume further that channel coefficients are defined as in Table 1.

TABLE 1

Example channel coefficients for radio propagation channel from each of the agent entities 300a, 300c, 300c towards each of the antennas of the server entity 200

| | Channel coefficient from agent entity 300a | Channel coefficient from agent entity 300b | Channel coefficient from agent entity 300c |
|---|---|---|---|
| towards first antenna at server entity 200: | a | b | c |
| towards second antenna at server entity 200: | a | −b | −c |

Assume that agent entity 300*a* is to communicate update $\delta_a$, that agent entity 300*b* is to communicate update $\delta_b$, and that agent entity 300*c* is to communicate update S. These three values thus represent one component of the corresponding gradient update vectors. In order for its data to properly reach the first antenna at server entity 200, agent entity 300*a* pre-processes $\delta_a$ with $\sqrt{P}a^*/|a|^2$, where P is a parameter selected such that the transmit power constraint is satisfied for all agent entities 300*a*, 300*b*, 300*c*. Similarly, for $\delta_b$ to properly reach the first antenna at server entity 200, agent entity 300*b* phase rotates $\delta_b$ with $\sqrt{P}b^*/|b|^2$. Similarly, for S, to properly reach the first antenna at server entity 200, agent entity 300*c* rotates $\delta_c$ by $\sqrt{P}c^*/|c|^2$. In this way, up to an irrelevant scaling factor $\delta_a+\delta_b+\delta_c$ is received at the first antenna at server entity 200, as desired. However, up to an irrelevant scaling factor, $\delta_a-\delta_b-\delta_c$ is received at the second antenna at server entity 200, and this contribution does not contain any information about $\delta_a+\delta_b+\delta_c$. Thus, the second antenna at the server entity 200 is not useful at all. In addition, it could be that there are significant imbalances in the path losses, say, $|c|<<|a|$ and $|c|<<|b|$. In that case, agent entity 300*c* will dictate how large P can be, and hence eventually dictate the signal-to-noise ratio in the signal received at the first antenna at server entity 200.

The embodiments disclosed herein therefore relate to mechanisms for performing an iterative learning process with agent entities 300*a*:300K and performing an iterative learning process with a server entity 200. In order to obtain such mechanisms there is provided a server entity 200, a method performed by the server entity 200, a computer program product comprising code, for example in the form of a computer program, that when run on processing circuitry of the server entity 200, causes the server entity 200 to perform the method. In order to obtain such mechanisms there is further provided an agent entity 300*k*, a method performed by agent entity 300*k*, and a computer program product comprising code, for example in the form of a computer program, that when run on processing circuitry of agent entity 300*k*, causes agent entity 300*k* to perform the method.

Figure 3:
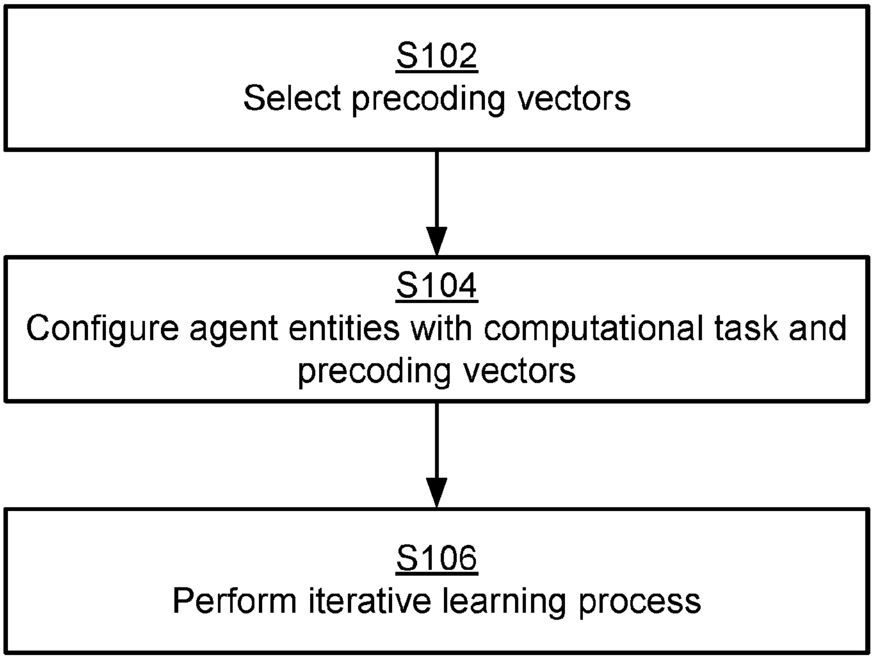
FIGS. 3, 4, 5, and 6 are flowcharts of methods according to embodiments.

Reference is now made to FIG. 3 illustrating a method for performing an iterative learning process with agent entities 300*a*:300K as performed by the server entity 200 according to an embodiment. The server entity 200 communicates with the agent entities 300*a*:300K over a radio propagation channel 150.

S102: The server entity 200 selects precoding vectors. One individual precoding vector is selected for each of the agent entities 300*a*:300K. The precoding vectors are to be used by the agent entities 300*a*:300K when reporting computational results of a computational task to the server entity 200. The precoding vectors are selected as a function of uplink channel estimates of the radio propagation channel 150 between antennas of all the agent entities 300*a*:300K to antennas of the server entity 200. That is, the precoding vector for agent entity 300*k* is thus selected as function of the radio propagation channel 150 between the antennas of agent entity 300*k* to the antennas of the server entity 200. Hence, it might be assumed that each of the agent entities 300*a*:300K as well as the server entity 200 has access to a respective set of antennas, as in FIG. 1.

S104: The server entity 200 configures the agent entities 300*a*:300K with the computational task and the precoding vectors.

S106: The server entity 200 performs the iterative learning process with the agent entities 300*a*:300K until a termination criterion is met.

As an introductory non-limiting and illustrative example, assume that there are K=3 agent entities 300*a*, 300*b*, 300*c*, that there are M=2 antennas at the server entity 200, and that there are L=2 antennas per agent entity. Assume further that agent entities 300*a*, 300*b* have good fading (path loss) coefficients to both antennas at the server entity 200, but that agent entity 300*c* has a good fading channel only to the second antenna at the server entity 200. The server entity 200 therefore selects precoding vectors for the agent entities 300*a*, 300*b* such that the respective data ($\delta_a$ and $\delta_b$ respectively) as transmitted by the agent entities 300*a*, 300*b* add up with a scaling of 0.5 at each of the antennas at the server entity 200. This can be accomplished by setting $$w_a = G_a^{-1}[0.5, 0.5]^T \text{ and } w_a = G_a^{-1}[0.5, 0.5]^T.$$

Furthermore, the server entity 200 selects precoding vectors for agent entity 300*c* such that agent entity 300*c* transmit its data $\delta_c$ with a spatial null into the direction towards the first antenna at the server entity 200 and a beam (with received amplitude 1) towards the second antenna at the server entity 200. This can be accomplished by setting $$w_c = G_c^{-1}[0, 1]^T.$$

This way, at the first antenna the server entity 200 receives $0.5(\delta_1+\delta_2)$, and at the second antenna the server entity 200 receives $0.5(\delta_1+\delta_2)+\delta_3$. Summing up the signals at both antennas, using a linear combining vector $v=[1,1]^T$, yields $\delta_1+\delta_2+\delta_3$ (plus noise), as desired.

Embodiments relating to further details of performing an iterative learning process with agent entities 300*a*:300K as performed by the server entity 200 will now be disclosed.

The termination criterion in some non-limiting examples can be when a pre-determined number of iterations have been reached or when the computational results differ less than a threshold value from one iteration to the next.

There may be different ways for the server entity 200 to select the precoding vectors in step S102. Different embodiments relating thereto will now be described in turn.

In some embodiments, as part of performing the iterative learning process, the server entity 200 sums the computational results reported by all the agent entities 300*a*:300K per iteration into a sum, and the precoding vectors are determined with respect to an unbiasedness constraint of the sum of the computational results. For example, for two agent entities, the unbiasedness constraint can be formulated as $E[\widehat{\delta_1+\delta_2}]=\delta_1+\delta_2$. The precoding vectors might then be selected to minimize the variance $var(\widehat{\delta_1+\delta_2})$.

In general terms, the precoding vectors can be selected by solving an optimization problem subject to the server entity 200 receiving the computational results from the agent entities 300*a*:300K on all the antennas of the server entity 200.

For example, the selected based on power constraint at each agent entity 300*k*, such that $\|w_k\|^2$ is less than some predetermined constant. In particular, in some embodiments, each of the precoding vectors is represented by a weighting coefficient vector $w_k$ with one weighting coefficient per antenna at agent entity k, and wherein $\|w_k\|^2<\xi_k$, for all $k\in\{1, 2, \ldots, K\}$, where $\xi_k$ are power constraint values. These power constraint values may all be equal, or different, depending on the characteristics of the agent entities 300*a*:300K.

In some aspects, the selection of the precoding vectors is based on utilizing a linear combining vector v. In particular, in some embodiments, the precoding vectors are selected as a function of a linear combining vector v, where:

$$E\left[v^T(G_1w_1\delta_1 + G_2w_2\delta_2 + \ldots + G_Kw_K\delta_K + z)\right] = \delta_1 + \delta_2 + \ldots + \delta_K$$

where z represents received noise, where $G_k$ represents the uplink channel estimates and denotes the radio propagation channel from agent entity k to the server entity 200, and where $\delta_k$ denotes the computational result reported from agent entity k.

There could be different ways to select the linear combining vector v. In some embodiments, $v^TG_kw_k=1$ for all E {1, 2, . . . , K}. In this respect, the linear combining vector v might be selected such that $v^TG_kw_k$ is equal to 1 within some pre-determined margin epsilon. In some embodiments, the linear combining vector v is determined by solving an optimization problem. For example, the optimization problem might be defined as:

minimize $\|v\|^2$ subject to $$E\left[v^T(G_1w_1\delta_1 + G_2w_2\delta_2 + \ldots + G_Kw_K\delta_K + z)\right] = \delta_1 + \delta_2 + \ldots + \delta_K.$$

As above, the equality might be within some pre-determined margin epsilon.

To find the combining vector v that results in an unbiased estimate, the constraints $v^TG_kw_k=1$ should be satisfied for all k=1, . . . , K. Since IWO are to be selected in a later stage, consider them fixed for now. The matrix $G_k$ is of dimension M×L. Hence $\{G_kw_k\}$ are M-vectors. Thus, there are K linear constraints, each of which confine v to an (M−1)-dimensional subspace. A solution is guaranteed to exist for any $\{w_k\}$ as long as M is at least as large as K. But for many choices of $\{w_k\}$, a solution for v will exist even if M<K, see the examples below. If v is instead selected to minimize the mean-square error, then the problem of finding v is always tractable. For example, with Gaussian priors the mean-square error is a quadratic function of v, and thus finding v is an unconstrained optimization problem. For k=2, the optimization problem corresponds to minimizing var($\widehat{\delta_1+\delta_2}$) with constraints on power with respect to $w_1$ and $w_2$, and with a constraint such that $E[\widehat{\delta_1+\delta_2}]=\delta_1+\delta_2$.

Different ways to solve the optimization problem will be disclosed next.

One way of solving the optimization problem is to search through a predetermined (fixed) set of combinations of beams (defined by the precoding vectors), that satisfy the power constraints. These combinations of beams may have been pre-obtained, for example, by laying out beams with angle-of-arrivals on a grid, for some assumed antenna topology. Hence, in some embodiments, the precoding vectors are selected from a predetermined set of precoding vectors. Alternatively, the precoding vectors are found by applying a clustering algorithm to a set of empirically obtained precoding vectors that have been found to be good for the locations that the agent entities 300*a*:300K are at. Alternatively, the precoding vectors may have been constructed by selecting beam vectors at random.

For each candidate beam vector combination, all $w_k$ are fixed and the problem of minimizing $\|v\|^2$ under the unbiasedness constraint is a linearly constrained quadratic problem, which can be solved by any method in the state-of-the-art, yielding the vector v along with the resulting variance. The server entity 200 Might then select the combination of precoding vectors (and the associated v), among the predetermined set of combinations, for which the resulting variance is the smallest.

Once a solution to the optimization problem has been found, in case the power constraints are not met with equality, $\{w_k, v\}$ can be renormalized as follows. First $w_k$ are scaled up with a factor that makes at least one power constraint satisfied with equality (and the other satisfied—with or without equality). Then, v is scaled down correspondingly so that the unbiasedness constraint is still satisfied.

In some embodiments, the optimization problem is solved by alternatingly and iteratively determining the weighting coefficient vectors $w_k$ and the linear combining vector v. Hence, alternating optimization can be used by cycling between the choice of $\{w_k\}$ and the choice of v. For example, the server entity 200 might start with an initial guess of $\{w_k\}$, and then find the best v as disclosed above. Once the optimal v (for these $w_k$ has been found, then the so-obtained v is kept fixed, and the precoding vectors $w_k$ are adjusted in a way such that they still satisfy the unbiasedness constraint and at the same time the total sum of all power values $\|w_k\|^2$ is minimized. Optionally, a random perturbation to $w_k$ may be added in this step as well. This may be accomplished by solving a linearly constrained quadratic optimization problem. Once the solution is found, $\{w_k,v\}$ can be re-normalized as described above. Next, the so-obtained $w_k$ are kept fixed, and $\|v\|^2$ is minimized under the unbiasedness constraint. This again amounts to solving a linearly constrained quadratic problem, which can be done by using any methods in state of the art. Next, $w_k$ are adjusted, and so forth.

Combinations of any of the above disclosed embodiments (e.g., using a pre-determined set of combinations for $\{w_k\}$ and using cyclic/alternating optimization) are possible. For example, a pre-determined set of combinations for $\{w_k\}$ can be used to find an initial solution for $\{w_k\}$ which is then used as the initial guess for cyclic/alternating optimization. A yet further approach is to use a neural network to return the optimal $\{w_k,v\}$ for given power constraints and given $G_k$. The network may be trained by using the methods described above to obtain the ground truth.

The precoding vectors might also be selected based on further information, such as information of the agent entities 300*a*:300K and/or of the user equipment 170*a*:170K in which the agent entities 300*a*:300K are provided. One non-limiting example of such information is beamforming capability information. Hence, in some embodiments, the precoding vectors are selected based on beamforming capability information received from the agent entities 300*a*:300K. The beamforming capability information for agent entity k specifies which precoding vectors that can be applied at agent entity k, where k–{1, 2, . . . , K}. Further in this respect, the server entity 200 might receive, from the agent entities 300*a*:300K, information associated to the device capabilities associated to training models as part of a device capability information message. The server entity 200 might from this information determine one or more models according to which the iterative learning process is to be performed. The device capability information message might be transmitted via radio resource control (RRC) signaling, for instance during an initial registration process of the user equipment 170*a*:170K with the network node 160 or of the agent entities 300*a*:300K with the server entity 200. The device capability information message could comprise information associated to the device capabilities for participation in the iterative learning process.

In some aspects the precoding vector comprises a beamforming direction vector (which could be represented as an index pointing to a codebook, or found as disclosed above). Hence, in some embodiments, each of the precoding vectors identifies a beamforming direction vector. Each component of the precoding vectors might have an amplitude component and a phase component. The amplitude component and the phase component are common for all elements per precoding vector but are individual per each of the agent entities 300*a*:300K.

Figure 4:
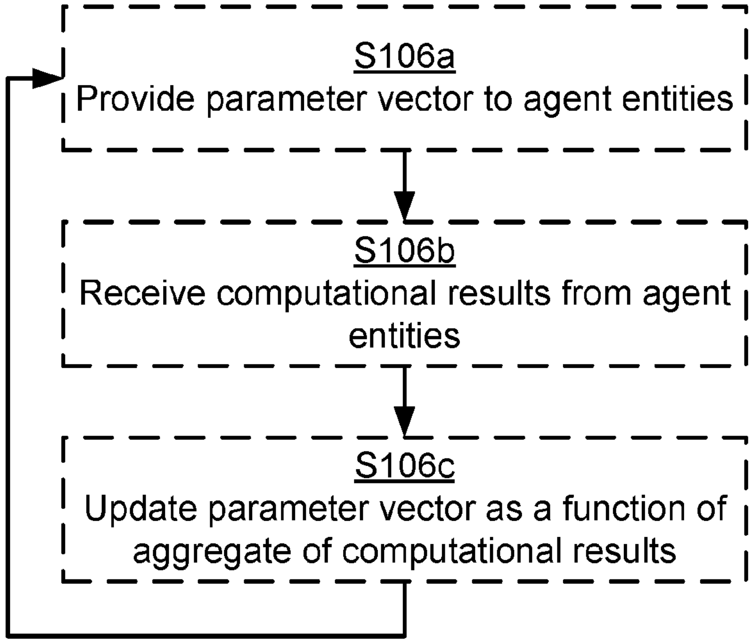

Intermediate reference is next made to the flowchart of FIG. 4 showing optional steps of one iteration of the iterative learning process that might be performed by the server entity 200 during each iteration of the iterative learning process in S106.

S106*a*: The server entity 200 provides a parameter vector of the computational task to the agent entities 300*a*:300K.

S106*b*: The server entity 200 receives the computational results as a function of the parameter vector from the agent entities 300*a*:300K.

S106*c*: The server entity 200 updates the parameter vector as a function of an aggregate of the received computational results.

In some examples, the agent entities 300*a*:300K are configured to repeat the transmission of each component of $\{\delta_k\}$ using different precoding vectors. For each agent entities 300*a*:300K the server entity 200 might therefore determine a family of J precoding vectors $$\{w_k^j\},\ j = 1, \ldots, J,$$

and have the k:th agent entity transmit each component of $\delta_k$J times, the j:th time using the precoding vector $$w_k^j.$$

Hence, in some embodiments, the server entity 200 configures the agent entities 300*a*:300K to apply at least two different precoding vectors to each of the computational results reported to the server entity 200.

Further in this respect, the server entity 200 might determine to keep the selected precoding vectors for the agent entities 300*a*:300K until a condition is triggered. In this case, new uplink channel estimates need not to be acquired by the server entity 200 for each iteration round, but rather on a per need basis, as determined by one or more triggering conditions.

The triggering condition can be based on performance. The precoding vectors can be based on the performance of the model. The server entity 200 might, for example, test the model on a dataset located in the server entity 200, and check whether the current global model meets the prediction requirements (for example the CSI compression loss is within a certain threshold in the first below example, or the server entity 200 has proper understanding of the mapping between two carriers in the below second example). The server entity 200 might also check the model improvements after each iteration round, for example with respect to an increase or decrease in training or testing error. The performance can also be represented by performance feedback as reported by the agent entities 300*a*:300K. The performance feedback might, for example, be provided in terms of prediction accuracies for the local dataset for each agent entity 300*a*:300K. An agent entity 300*k* might, for example, indicate that the model is not improving the prediction performance on its local dataset. The server entity 200 might then configure the agent entity 300*k* to report in case the improvements are not within a certain threshold range over a number of training rounds.

The triggering condition can be based on channel state information. In case the server entity 200 has access to uncertain channel state information, for example due to operating in low signal to interference plus noise ratio (SINR) region for multiple agent entities 300*a*:300K, the server entity 200 can configure these agent entities 300*a*:300K to send more frequent uplink pilots based on which the uplink channel estimates of the radio propagation channel 150 can be obtained and thus the precoding vectors be selected. Further, the server entity 200 might, in case the number of agent entities 300*a*:300K is large, group the agent entities 300*a*:300K based on their variations in channel state information. In this way, agent entities 300*a*:300K with comparatively large channel variations might be instructed to send uplink pilots more frequent in time than agent entities 300*a*:300K with comparatively small channel variations.

In some aspects, the herein disclosed embodiments are applied only for a subset of all agent entities 300*a*:300K participating in the iterative learning process with the server entity 200. That is, some agent entities will transmit their model updates using unicast while other agent entities will participate in the iterative learning process using FL and with over-the-air computation.

Figure 5:
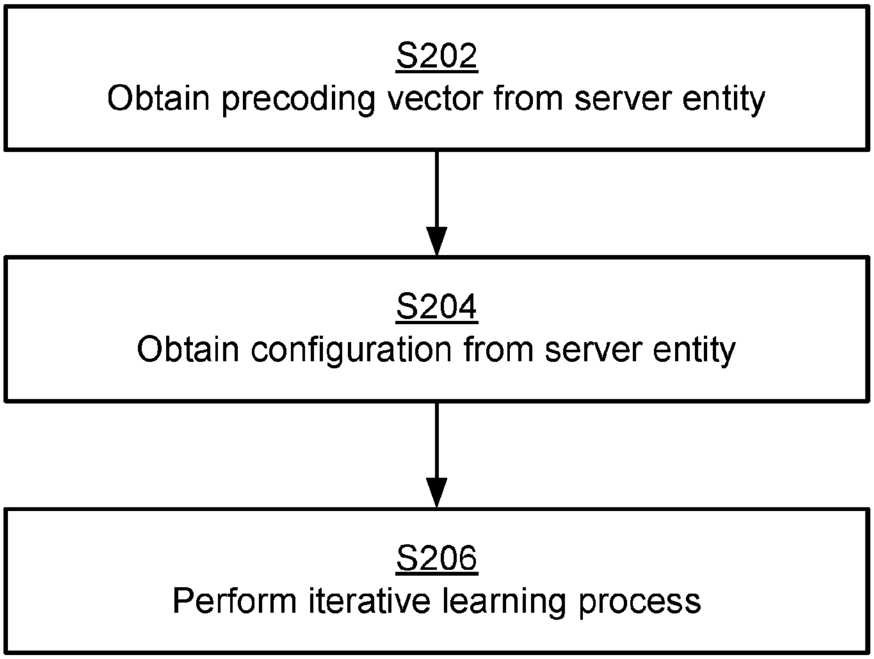

Reference is now made to FIG. 5 illustrating a method for performing an iterative learning process with a server entity 200 as performed by one of the agent entities 300*a*:300K, denoted agent entity 300*k*, according to an embodiment.

S202: Agent entity 300*k* obtains a precoding vector to be used by agent entity 300*k* when reporting computational results of a computational task to the server entity 200.

S204: Agent entity 300*k* obtains configuration in terms of the computational task from the server entity 200.

S206: Agent entity 300*k* performs the iterative learning process with the server entity 200 until a termination criterion is met. Agent entity 300*k* as part of performing the iterative learning process applies the precoding vector to the computational results when sending the computational results to the server entity 200.

Embodiments relating to further details of performing an iterative learning process with a server entity 200 as performed by agent entity 300*k* will now be disclosed.

The termination criterion in some non-limiting examples can be when a pre-determined number of iterations have been reached or when the computational results differ less than a threshold value from one iteration to the next.

As disclosed above, in some embodiments, the precoding vector identifies a beamforming direction vector.

As disclosed above, in some embodiments, each component of the precoding vector has an amplitude component and a phase component, and the amplitude component and the phase component are common for all elements of the precoding vector but are individual for the agent entity 300*k*.

As disclosed above, in some embodiments, the precoding vector is selected from a predetermined set of precoding vectors.

As disclosed above, in some embodiments, agent entity 300*k* is configured by the server entity 200 to apply at least two different precoding vectors to each of the computational results reported to the server entity 200.

Figure 6:
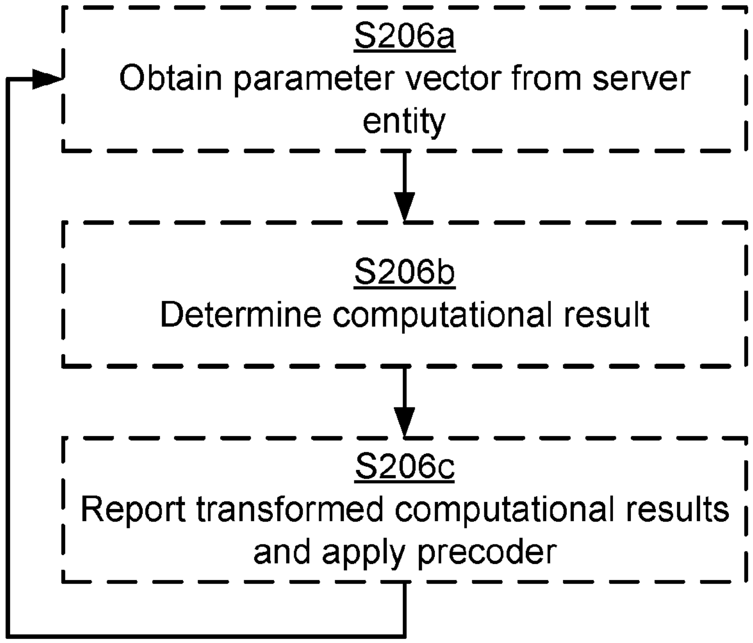

Intermediate reference is next made to the flowchart of FIG. 6 showing optional steps of one iteration of the iterative learning process that might be performed by agent entity 300*k* during each iteration of the iterative learning process in S206.

S206*a*: Agent entity 300*k* obtains a parameter vector of the computational problem from the server entity 200.

S206*b*: Agent entity 300*k* determines the computational result of the computational task as a function of the obtained parameter vector for the iteration and of data locally obtained by agent entity 300*k*.

S206*c*: Agent entity 300*k* reports the transformed computational result to the server entity 200. The precoding vector is applied to the computational results when the computational results are sent towards the server entity 200.

Figure 7:
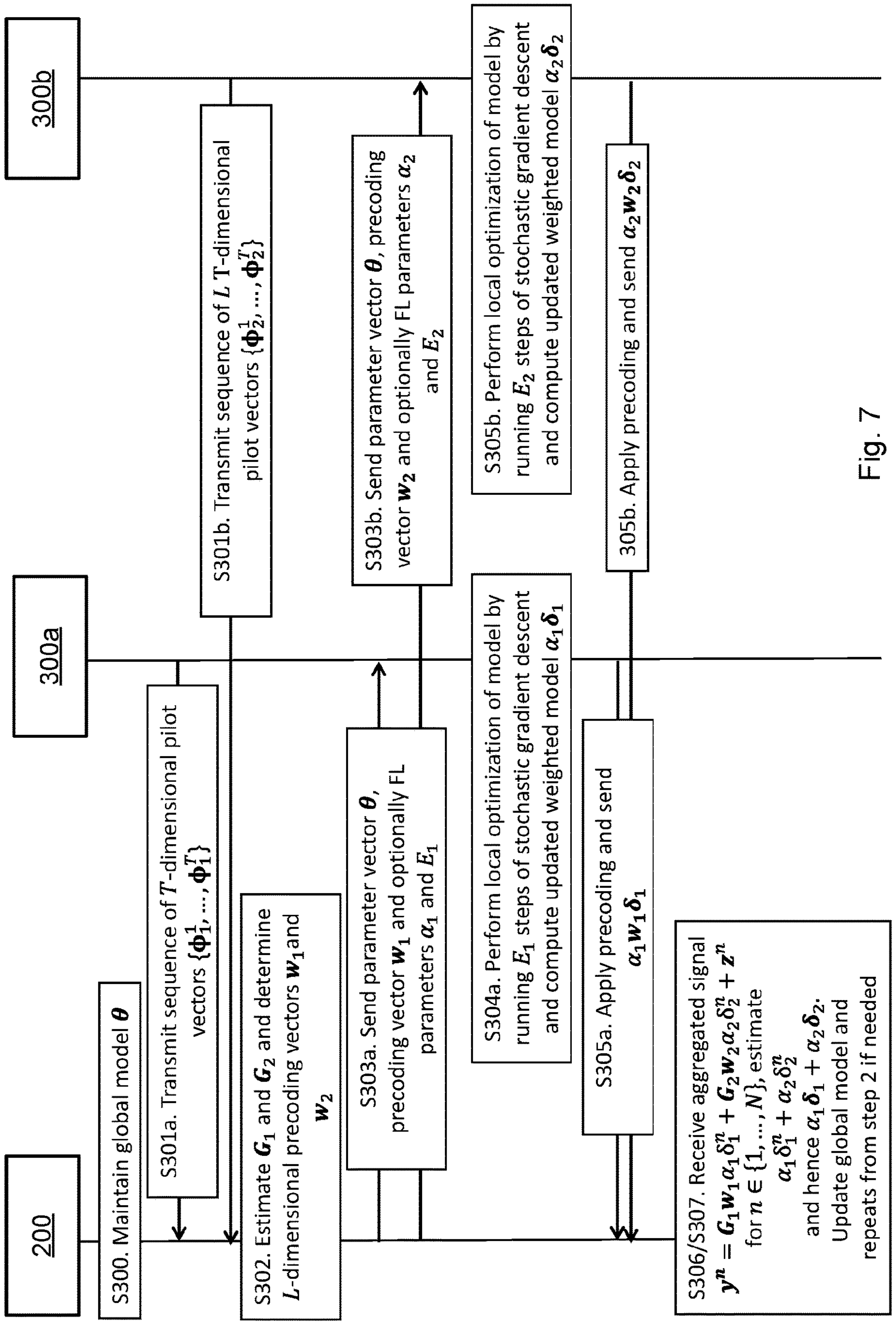
FIG. 7 is a signalling diagram according to an embodiment.
Figure 8:
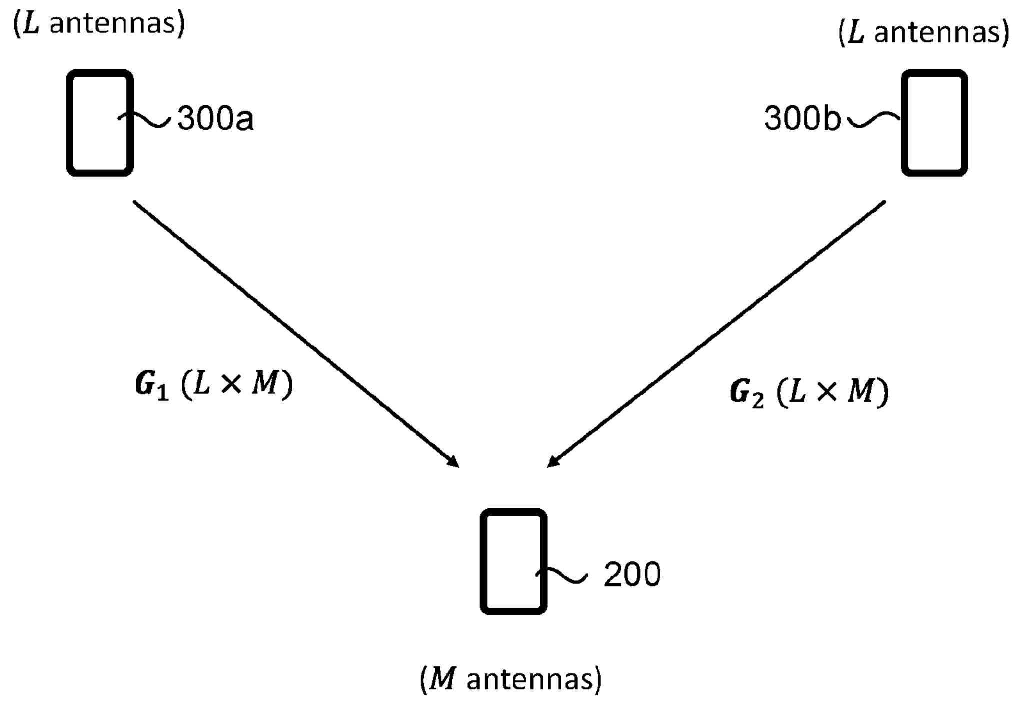

One particular embodiment of performing an iterative learning process with agent entities 300*a*:300K as performed by the server entity 200 and of performing an iterative learning process with a server entity 200 as performed by agent entity 300*k* based on at least some of the above disclosed embodiments will now be disclosed in detail with reference to the signalling diagram of FIG. 7. For simplicity of exposition, we consider a system with one server entity 200 and two agent entities 300*a*, 300*b* (k=1, 2). The agent entities 300*a*, 300*b* have access to L antennas each for communicating with the server entity 200, and the server entity 200 has access to M antennas for communicating with the agent entities 300*a*, 300*b*. The radio propagation channel 150 from agent entity 300*a* to the server entity 200 (in a given resource block, or coherence interval) is of dimension M×L and is denoted by $G_1$. Similarly, the radio propagation channel 150 from agent entity 300*b* to the server entity 200 is of the same dimension and denoted $G_2$. This is illustrated in FIG. 8. The extension to an arbitrary number of agent entities 300*a*:300K should be clear to the skilled person in the art.

S300: The server entity 200 maintains a global model vector $\theta$ of dimension N.

S301*a*, S301*b*: The agent entities 300*a*, 300*b* transmit uplink pilots. The uplink pilots might be transmitted using e.g. sounding reference signals (SRS). Specifically, agent entity 300*a* transmits a first sequence of T L-dimensional vectors $$\{\phi_1^1, \ldots, \phi_1^T\}$$

and agent entity 300*b* transmits a second sequence of T L-dimensional vectors $$\{\phi_2^1, \ldots, \phi_2^T\},$$

where the rows of the matrix $$[\phi_k^1, \ldots, \phi_k^T]$$

comprise the pilot sequences (of length T). In some examples, all pilot sequences are mutually orthogonal with the same norm, which results in good estimation accuracy. In this case, $$\Phi_k\Phi_k^H = \alpha I \text{ for } k = 1, 2 \text{ and } \Phi_1\Phi_2^H = 0,$$

for some positive constant α. In another example, the pilot sequences are mutually orthogonal and have different norms, in which case $$\Phi_k\Phi_k^H$$

are diagonal matrices. Then the antenna array at the server entity 200 receives T M-dimensional vectors $$\{y_p^1, \ldots, y_p^T\},$$

where $$y_p^t = G_1\phi_1^t + G_2\phi_2^t + z_p^t$$

where $$z_p^t$$

is noise, and t∈1,2, . . . , T. For future use, define $$Y_p = [y_p^1, \ldots, y_p^T] \text{ and } \Phi_k = [\phi_k^1, \ldots, \phi_k^T].$$

S302: Based on $$\{y_p^1, \ldots, y_p^T\},$$

the server entity 200 estimates $G_1$ and $G_2$ using any suitable technique, for example based on least-square estimates or minimum mean squared error (MMSE) estimates. In some examples, where $$\phi_1^t \text{ and } \phi_2^t$$

are orthogonal with the same norm, the least-squares channel estimates are obtained by projecting $$y_p^t \text{ onto } \phi_1^t \text{ and } \phi_2^t,$$

respectively:

$$\widehat{G_k} = Y_p\Phi_k^H/\alpha.$$

In some examples, of statistics of the noise $$(z_p^t)$$

is known, for example that the noise contains in addition to thermal noise also interference (e.g., from other cells or out-of-system interference), this statistics can be incorporated to form, for instance, MMSE estimates. Based on the estimated $G_1$ and $G_2$, the server entity 200 determines two L-dimensional precoding vectors $w_1$ (for agent entity 300*a*) and $w_2$ (for agent entity 300*b*). The precoding vectors are determined as disclosed above.

S303*a*, S303*b*: The server entity 200 broadcasts the model θ to the agent entities 300*a*, 300*b*. This can be done using any suitable technique for wireless transmission. The server entity 200 further communicates $w_1$ to agent entity 300*a* and $w_2$ to agent entity 300*b*, possibly over a control channel. These precoding vectors are scaled such that they also incorporate power control and phase rotations for each agent entity 300*a*, 300*b*. In some examples, the server entity 200 includes the iterative learning parameters (for example number of iterations of gradient update and weights denoted by $E_k$, $\alpha_k$, for agent $A_k$, k∈{1, 2} respectively).

S304*a*, S304*b*: The agent entities 300*a*, 300*b* obtain, based on the broadcasted global model θ and locally available training data, gradient updates represented by a N-dimensional vectors. That is, agent entity 300*a* obtains 81 and agent entity 300*b* obtains 81 based on their local data and the global model θ.

S305*a*, S305*b*: Agent entity 300*a* and agent entity 300*b* simultaneously transmit 81 and 82, respectively, using precoding vectors $w_1$ (for agent entity 300*a*) and $w_2$ (for agent entity 300*b*). One component of the gradient update vectors is transmitted at a time, so the complete transmission takes N channel uses.

S306: The server entity 200, in the n:th channel use (corresponding to the n:th component of the gradient update vectors), receives the M-dimensional vector:

$$y^n = G_1 w_1 \delta_1^n + G_2 w_2 \delta_2^n + z^n$$

where $$\delta_k^n$$

is the n:th component of $\delta_k$ (corresponding to agent entity k) and $z^n$ is noise. Based on $y^n$, the server entity 200 now determines an estimate of $$\delta_1^n + \delta_2^n.$$

This processing is identical for all components $n \in 1, \ldots, N$, so henceforth the component index n is dropped. For example, the server entity 200 might use a linear, unbiased estimator of $\delta_1 + \delta_2$. This can be achieved by the server entity 200 first determining a linear combining vector v (of dimension M) and then computing $$\widehat{\delta_1 + \delta} = v^T y$$

In some examples, v is selected such that $E[\widehat{\delta_1 + \delta_2}] = \delta_1 + \delta_2$. The resulting estimate is unbiased, correct on average, where the average refers to the statistical average over the noise z. This is achieved if v satisfies:

$$v^T G_1 w_1 = 1$$

$$v^T G_2 w_2 = 1$$

In some examples, v is selected such that these relations hold, and in addition, to minimize the variance of the estimate, which equals $\mathrm{var}(\widehat{\delta_1 + \delta_2}) = \|v\|^2 \sigma^2$, where $\sigma^2$ is the variance of each component of z (assuming these noise components are uncorrelated). Such a linear combining vector v can be found in closed form by solving a linearly constrained quadratic optimization problem.

In some examples, v is selected to minimize the mean-square error, or some other Bayesian cost of the error, $$v^T y - (\delta_1 + \delta_2).$$

S307: The server entity 200 updates the global model θ based on the estimate obtained in step S306.

The process is repeated from step S303*a* (or even S301*a*) if the termination criterion is not met.

Illustrative examples where the herein disclosed embodiments apply will now be disclosed.

According to a first example, the computational task pertains to prediction of best secondary carrier frequencies to be used by user equipment 170*a*:170K in which the agent entities 300*a*:300K are provided. The data locally obtained by agent entity 300*k* can then represent a measurement on a serving carrier of the user equipment 170*k*. In this respect, the best secondary carrier frequencies for user equipment 170*a*:170K can be predicted based on their measurement reports on the serving carrier. The secondary carrier frequencies as reported thus defines the computational result. In order to enable such a mechanism, the agent entities 300*a*:300K can be trained by the server entity 200, where each agent entity 300*k* takes as input the measurement reports on the serving carrier(s) (among possibly other available reports such as timing advance, etc.) and as outputs a prediction of whether the user equipment 170*k* in which agent entity 300*k* is provided has coverage or not in the secondary carrier frequency. The device capability information message for agent entity 300*k* could indicate the frequencies for which agent entity 300*k* has local training data. The device capability information message for agent entity 300*k* could indicate device measurement accuracies, for example the reference signal received power; RSRP measurement accuracies, for agent entity 300*k*.

According to a second example, the computational task pertains to compressing channel-state-information using an auto-encoder, where the server entity 200 implements a decoder of the auto-encoder, and where each of the agent entities 300*a*:300K implements a respective encoder of the auto-encoder. An autoencoder can be regarded as a type of neural network used to learn efficient data representations (denoted by code hereafter). Instead of transmitting raw Channel Impulse Response (CIR) values from the user equipment 170*a*:170K to the network node 160, the agent entities 300*a*:300K encodes the raw CIR values using the encoders and report the resulting code to the server entity 200. The code as reported thus defines the computational result. The server entity 200, upon reception of the code from the agent entities 300*a*:300K, reconstructs the CIR values using the decoder. Since the code can be sent with fewer information bits, this will result in significant signaling overhead reduction. The reconstruction accuracy can be further enhanced if as many independent agent entities 300*a*:300K as possible are utilized. This can be achieved by enabling each agent entity 300*k* to contribute to training a global model preserved at the server entity 200. The device capability information message for agent entity 300*k* could indicate the frequencies and corresponding bandwidth that agent entity 300*k* has used during its dataset logging.

According to a third example, the computational task pertains to signal quality drop prediction. The signal quality drop prediction is based on measurements on wireless links used by user equipment 170*a*:170K in which the agent entities 300*a*:300K are provided. In this respect, based on received data, in terms of computational results, in the reports, the server entity 200 can learn, for example, what sequence of signal quality measurements (e.g. RSRP) that results in a large signal quality drop. After a model is trained, for instance using the iterative learning process, the server entity 200 can provide the model to the agent entities 300*a*:300K. The model can be provided either to agent entities 300*a*:300K having taken part in the training, or to other agent entities 300*a*:300K. The agent entities 300*a*:300K can then apply the model to predict future signal quality values. This signal quality prediction can then be used in the context of any of: initiating inter-frequency handover, setting handover and/or reselection parameters, changing device scheduler priority so as to schedule the user equipment 170*a*:170K when the expected signal quality is good. The data for training such a model is located at the device-side where the agent entities 300*a*:300K reside, and hence an iterative learning process as disclosed herein can be used to efficiently learn the future signal quality prediction. The device capability information message for agent entity 300*k* could indicate the forecasted time, i.e. for how many (milli-)seconds in time the model predicts. The device capability information message for agent entity 300*k* could indicate the dataset information, for example the measured channel state information signal (CSI-RS), synchronization signal blocks (SSBs), etc. used in the predictions.

There are also further examples of computational tasks where the herein disclosed embodiments for performing an iterative learning process can be applied, such as distributed training of a language model using keyboard input from users, distributed training of an object recognition algorithm using camera streams from many devices.

Figure 9:
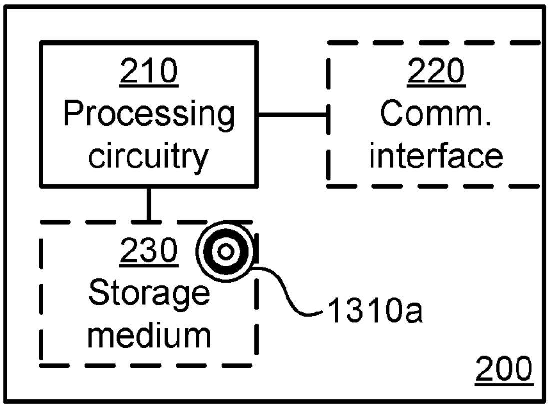
FIG. 9 is a schematic diagram showing functional units of a server entity according to an embodiment.

FIG. 9 schematically illustrates, in terms of a number of functional units, the components of a server entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310*a* (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the server entity 200 to perform a set of operations, or steps, as disclosed above. For example, the storage medium 230 may store the set of operations, and the processing circuitry 210 may be configured to retrieve the set of operations from the storage medium 230 to cause the server entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The server entity 200 may further comprise a communications interface 220 for communications with other entities, functions, nodes, and devices, either directly or indirectly. As such the communications interface 220 may comprise one or more transmitters and receivers, comprising analogue and digital components.

The processing circuitry 210 controls the general operation of the server entity 200 e.g. by sending data and control signals to the communications interface 220 and the storage medium 230, by receiving data and reports from the communications interface 220, and by retrieving data and instructions from the storage medium 230. Other components, as well as the related functionality, of the server entity 200 are omitted in order not to obscure the concepts presented herein.

Figure 10:
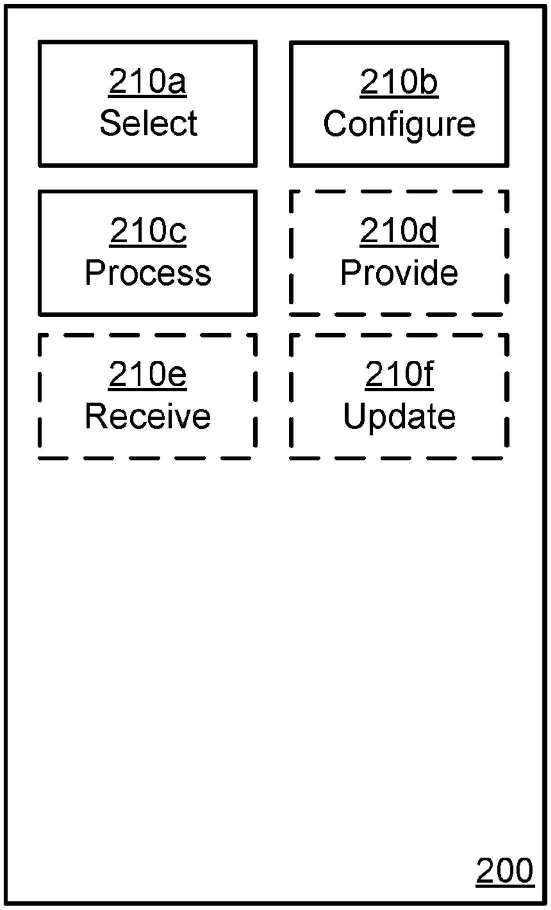
FIG. 10 is a schematic diagram showing functional modules of a server entity according to an embodiment.

FIG. 10 schematically illustrates, in terms of a number of functional modules, the components of a server entity 200 according to an embodiment. The server entity 200 of FIG. 10 comprises a number of functional modules; a select module 210*a* configured to perform step S102, a configure module 210*b* configured to perform step S104, and a process module 210*c* configured to perform step S106. The server entity 200 of FIG. 10 may further comprise a number of optional functional modules, such as any of a provide module 210*d* configured to perform step S106*a*, a receive module 210*e* configured to perform step S106*b*, and an update module 210*f* configured to perform step S106*c*. In general terms, each functional module 210*a*:210*f* may be implemented in hardware or in software. Preferably, one or more or all functional modules 210*a*:210*f* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*:210*f* and to execute these instructions, thereby performing any steps of the server entity 200 as disclosed herein.

The server entity 200 may be provided as a standalone device or as a part of at least one further device. For example, the server entity 200 may be provided in a node of the radio access network or in a node of the core network. Alternatively, functionality of the server entity 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. Thus, a first portion of the instructions performed by the server entity 200 may be executed in a first device, and a second portion of the instructions performed by the server entity 200 may be executed in a second device; the herein disclosed embodiments are not limited to any particular number of devices on which the instructions performed by the server entity 200 may be executed. Hence, the methods according to the herein disclosed embodiments are suitable to be performed by a server entity 200 residing in a cloud computational environment. Therefore, although a single processing circuitry 210 is illustrated in FIG. 10 the processing circuitry 210 may be distributed among a plurality of devices, or nodes. The same applies to the functional modules 210*a*:210*f* of FIG. 10 and the computer program 1310*a* of FIG. 13.

Figure 11:
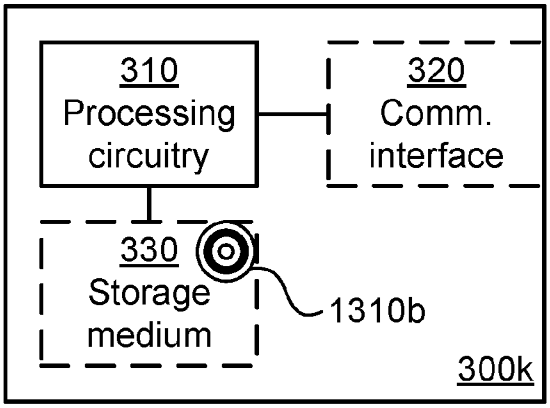
FIG. 11 is a schematic diagram showing functional units of an agent entity according to an embodiment.

FIG. 11 schematically illustrates, in terms of a number of functional units, the components of an agent entity 300*k* according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause agent entity 300*k* to perform a set of operations, or steps, as disclosed above. For example, the storage medium 330 may store the set of operations, and the processing circuitry 310 may be configured to retrieve the set of operations from the storage medium 330 to cause agent entity 300*k* to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

Agent entity 300*k* may further comprise a communications interface 320 for communications with other entities, functions, nodes, and devices, either directly or indirectly.

As such the communications interface 320 may comprise one or more transmitters and receivers, comprising analogue and digital components.

The processing circuitry 310 controls the general operation of agent entity 300*k* e.g. by sending data and control signals to the communications interface 320 and the storage medium 330, by receiving data and reports from the communications interface 320, and by retrieving data and instructions from the storage medium 330. Other components, as well as the related functionality, of agent entity 300*k* are omitted in order not to obscure the concepts presented herein.

Figure 12:
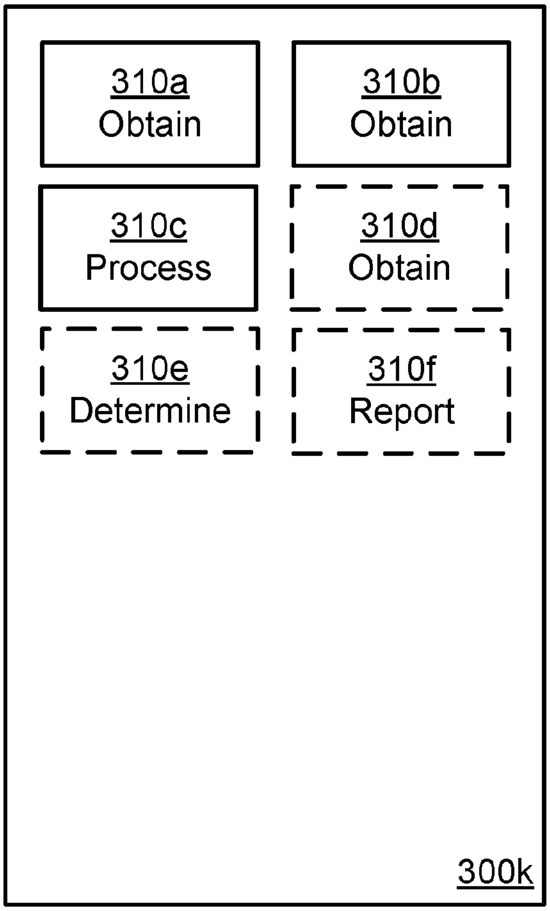
FIG. 12 is a schematic diagram showing functional modules of an agent entity according to an embodiment.

FIG. 12 schematically illustrates, in terms of a number of functional modules, the components of an agent entity 300*k* according to an embodiment. Agent entity 300*k* of FIG. 12 comprises a number of functional modules; an obtain module 310*a* configured to perform step S202, an obtain module 310*b* configured to perform step S204, and a process module 310*c* configured to perform step S206. Agent entity 300*k* of FIG. 12 may further comprise a number of optional functional modules, such as any of an obtain module 310*d* configured to perform step S206*a*, a determine module 310*e* configured to perform step S206*b*, and a report module 310*f* configured to perform step S206*c*. In general terms, each functional module 310*a*:310*f* may be implemented in hardware or in software. Preferably, one or more or all functional modules 310*a*:310*f* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*:310*f* and to execute these instructions, thereby performing any steps of agent entity 300*k* as disclosed herein.

Figure 13:
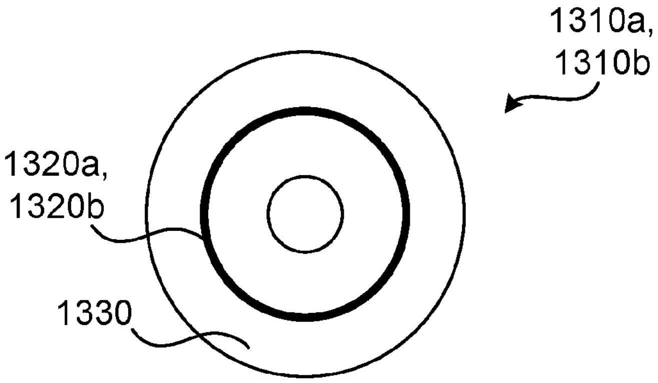
FIG. 13 shows one example of a computer program product comprising computer readable means according to an embodiment.

FIG. 13 shows one example of a computer program product 1310*a*, 1310*b* comprising computer readable means 1330. On this computer readable means 1330, a computer program 1320*a* can be stored, which computer program 1320*a* can cause the processing circuitry 210 and thereto operatively coupled entities and devices, such as the communications interface 220 and the storage medium 230, to execute methods according to embodiments described herein. The computer program 1320*a* and/or computer program product 1310*a* may thus provide means for performing any steps of the server entity 200 as herein disclosed. On this computer readable means 1330, a computer program 1320*b* can be stored, which computer program 1320*b* can cause the processing circuitry 310 and thereto operatively coupled entities and devices, such as the communications interface 320 and the storage medium 330, to execute methods according to embodiments described herein. The computer program 1320*b* and/or computer program product 1310*b* may thus provide means for performing any steps of agent entity 300*k* as herein disclosed.

In the example of FIG. 13, the computer program product 1310*a*, 1310*b* is illustrated as an optical disc, such as a CD (compact disc) or a DVD (digital versatile disc) or a Blu-Ray disc. The computer program product 1310*a*, 1310*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320*a*, 1320*b* is here schematically shown as a track on the depicted optical disk, the computer program 1320*a*, 1320*b* can be stored in any way which is suitable for the computer program product 1310*a*, 1310*b*.

Figure 14:
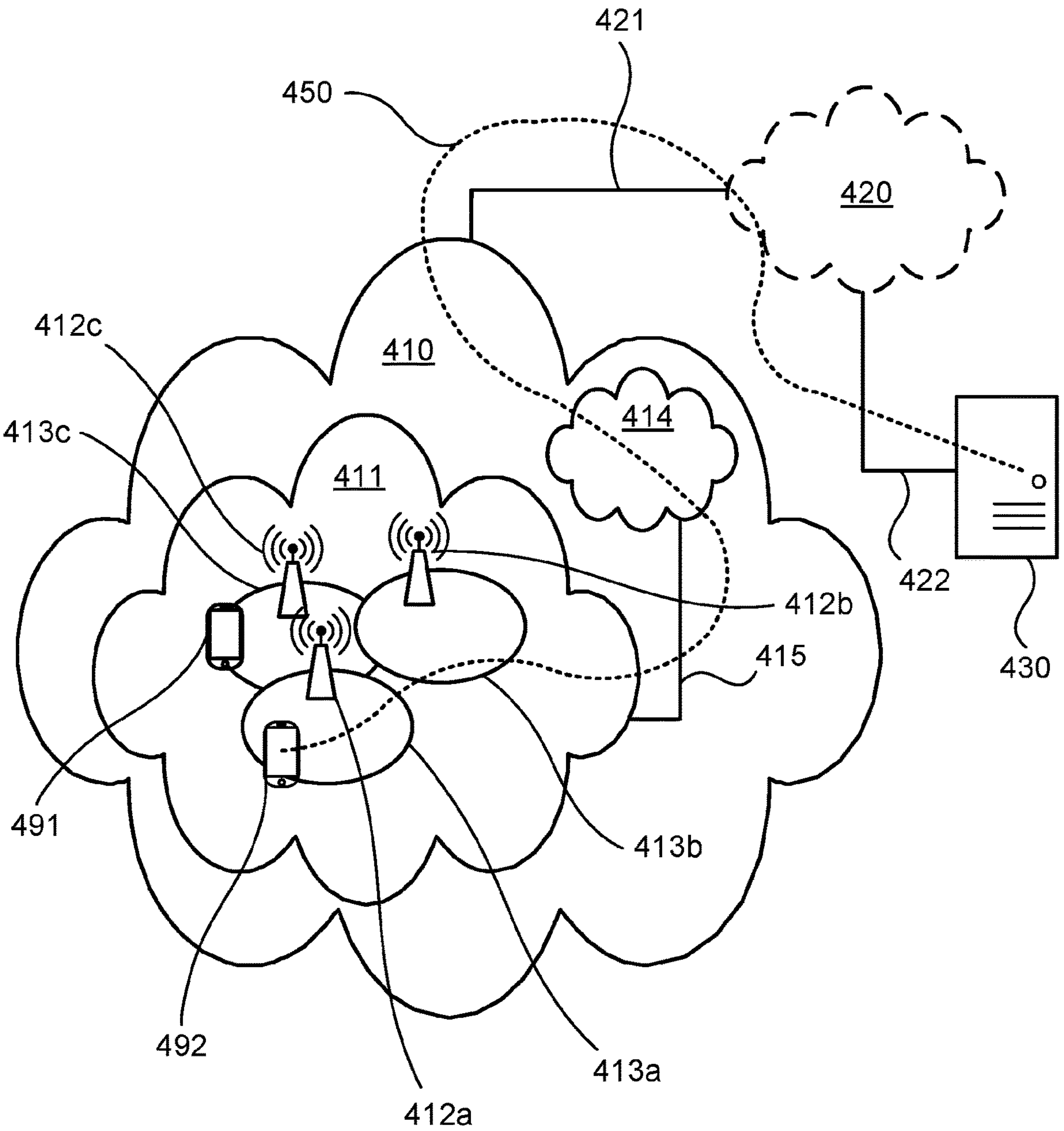
FIG. 14 is a schematic diagram illustrating a telecommunication network connected via an intermediate network to a host computer in accordance with some embodiments.

FIG. 14 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as access network 110 in FIG. 1, and core network 414, such as core network 120 in FIG. 1. Access network 411 comprises a plurality of radio access network nodes 412*a*, 412*b*, 412*c*, such as NBs, eNBs, gNBs (each corresponding to the network node 160 of FIG. 1) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to UEs 170*a*:170K of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 15:
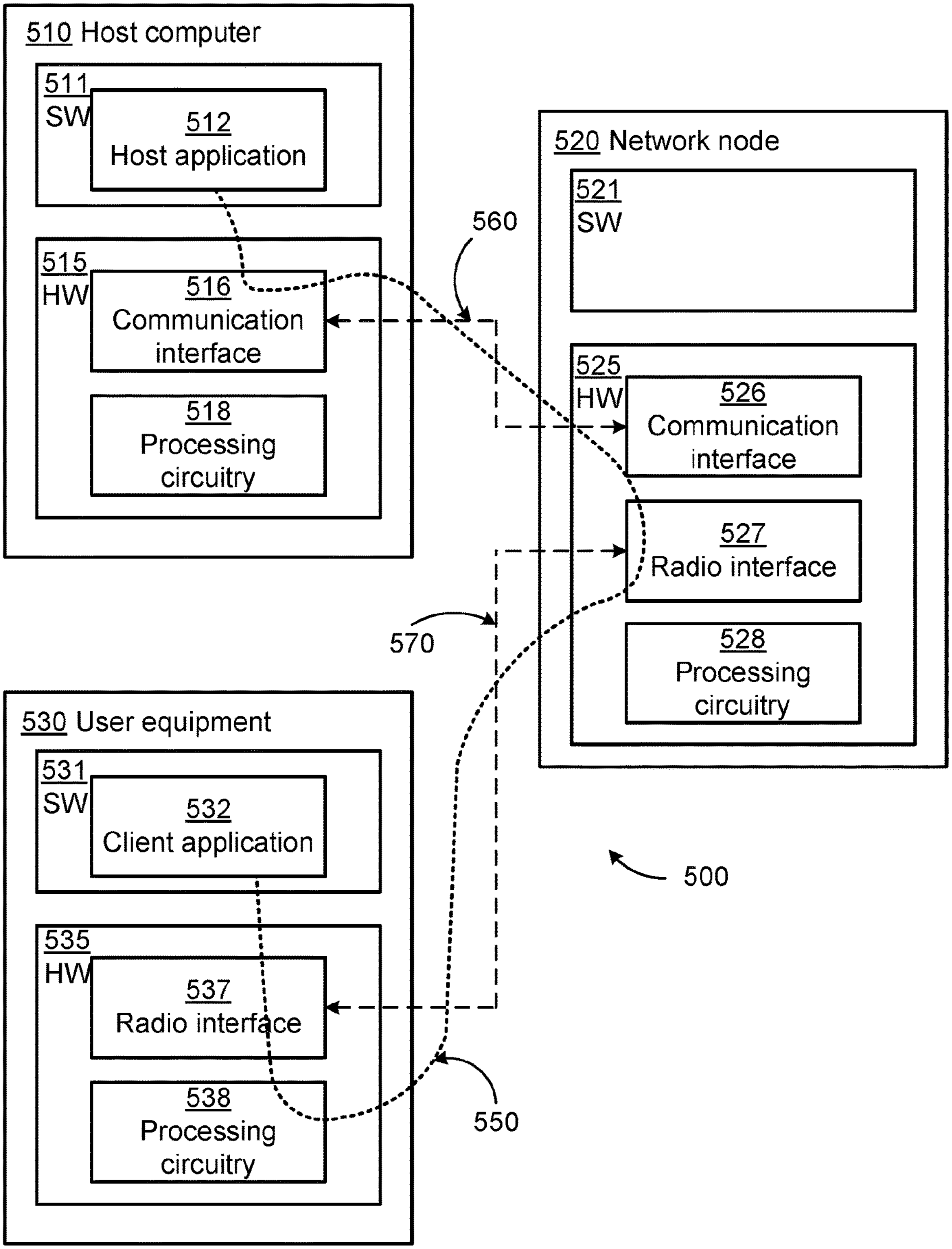
FIG. 15 is a schematic diagram illustrating host computer communicating via a radio base station with a terminal device over a partially wireless connection in accordance with some embodiments.

FIG. 15 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the UEs 170*a*:170K of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 160 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 15) served by radio access network node 520. Communication interface 526 may be configured to facilitate connection 560 to host computer 510. Connection 560 may be direct or it may pass through a core network (not shown in FIG. 15) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 15 may be similar or identical to host computer 430, one of network nodes 412*a*, 412*b*, 412*c* and one of UEs 491, 492 of FIG. 14, respectively. This is to say, the inner workings of these entities may be as shown in FIG. 15 and independently, the surrounding network topology may be that of FIG. 14.

In FIG. 15, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for performing an iterative learning process with agent entities, the method being performed by a server entity, the server entity communicating with the agent entities over a radio propagation channel, the method comprising:

selecting precoding vectors, one individual precoding vector for each of the agent entities, wherein the precoding vectors are to be used by the agent entities when reporting computational results of a computational task to the server entity, and wherein the precoding vectors are selected as a function of uplink channel estimates of the radio propagation channel between antennas of all the agent entities to antennas of the server entity;

configuring the agent entities with the computational task and the precoding vectors; and performing the iterative learning process with the agent entities until a termination criterion is met.

2. The method according to claim 1, wherein, as part of performing the iterative learning process, the server entity sums the computational results reported by all the agent entities per iteration into a sum, and wherein the precoding vectors are determined with respect to an unbiasedness constraint of the sum of the computational results.

3. The method according to claim 1, wherein the precoding vectors are selected by solving an optimization problem subject to the server entity receiving the computational results from the agent entities on all the antennas of the server entity.

4. The method according to claim 1, wherein each of the precoding vectors is represented by a weighting coefficient vector $w_k$ with one weighting coefficient per antenna at agent entity k, and wherein $\|w_k\|^2<\xi_k$, for all $k\in\{1, 2, \ldots, K\}$, where $\xi_k$ are power constraint values.

5. The method according to claim 1, wherein the precoding vectors are selected as a function of a linear combining vector v, and wherein:

$$E\left[v^T(G_1w_1\delta_1+G_2w_2\delta_2+\ldots+G_Kw_K\delta_K+z)\right]=\delta_1+\delta_2+\ldots+\delta_K$$

where z represents received noise, where $G_k$ represents the uplink channel estimates and denotes the radio propagation channel from agent entity k to the server entity, and where $\xi_k$ denotes the computational result reported from agent entity k.

6. The method according to claim 5, wherein $v^TG_kw_k=1$ for all $\in\{1, 2, \ldots, K\}$.

7. The method according to claim 5, wherein the linear combining vector v is determined by solving an optimization problem.

8. The method according to claim 3, wherein the optimization problem is defined as:

minimize $\|v\|^2$ subject to $$E\left[v^T(G_1w_1\delta_1+G_2w_2\delta_2+\ldots+G_Kw_K\delta_K+z)\right]=\delta_1+\delta_2+\ldots+\delta_K.$$

9. The method according to claim 8, wherein the optimization problem is solved by alternatingly and iteratively determining the weighting coefficient vectors $w_k$ and the linear combining vector v.

10. The method according to claim 1, wherein the precoding vectors are selected based on beamforming capability information received from the agent entities, wherein the beamforming capability information for agent entity k specifies which precoding vectors that can be applied at the agent entity k, where $k\in\{1, 2, \ldots, K\}$.

11. The method according to claim 1, wherein each of the precoding vectors identifies a beamforming direction vector.

12. The method according to claim 1, wherein each component of the precoding vectors has an amplitude component and a phase component, wherein the amplitude component and the phase component are common for all elements per precoding vector but are individual per each of the agent entities.

13. The method according to claim 1, wherein the server entity configures the agent entities to apply at least two different precoding vectors to each of the computational results reported to the server entity.

14. A method for performing an iterative learning process with a server entity, the method being performed by an agent entity, the method comprising:

obtaining a precoding vector to be used by the agent entity when reporting computational results of a computational task to the server entity;

obtaining configuration in terms of the computational task from the server entity; and performing the iterative learning process with the server entity until a termination criterion is met, wherein the agent entity as part of performing the iterative learning process applies the precoding vector to the computational results when sending the computational results to the server entity.

15. The method according to claim 14, wherein the precoding vector identifies a beamforming direction vector.

16. The method according to claim 14, wherein each component of the precoding vector has an amplitude component and a phase component, wherein the amplitude component and the phase component are common for all elements of the precoding vector but are individual for the agent entity.

17. The method according to claim 14, wherein the agent entity is configured by the server entity to apply at least two different precoding vectors to each of the computational results reported to the server entity.

18. A server entity for performing an iterative learning process with agent entities, the server entity comprising processing circuitry, the processing circuitry being configured to cause the server entity to:

select precoding vectors, one individual precoding vector for each of the agent entities, wherein the precoding vectors are to be used by the agent entities when reporting computational results of a computational task to the server entity, and wherein the precoding vectors are selected as a function of uplink channel estimates of the radio propagation channel between antennas of all the agent entities to antennas of the server entity;

configure the agent entities with the computational task and the precoding vectors; and perform the iterative learning process with the agent entities until a termination criterion is met.

19. The server entity according to claim 18, wherein the processing circuitry is configured to cause the server entity to, as part of performing the iterative learning process, sum the computational results reported by all the agent entities per iteration into a sum, and wherein the precoding vectors are determined with respect to an unbiasedness constraint of the sum of the computational results.

20. An agent entity for performing an iterative learning process with a server entity, the agent entity comprising processing circuitry, the processing circuitry being configured to cause the agent entity to:

obtain a precoding vector to be used by the agent entity when reporting computational results of a computational task to the server entity;

obtain configuration in terms of the computational task from the server entity; and perform the iterative learning process with the server entity until a termination criterion is met, wherein the agent entity as part of performing the iterative learning process applies the precoding vector to the computational results when sending the computational results to the server entity.

* * * * *